Dec. 27, 1938.　　　　　F. POSTMA　　　　　2,141,823
ABRADING LINER
Filed Sept. 17, 1937
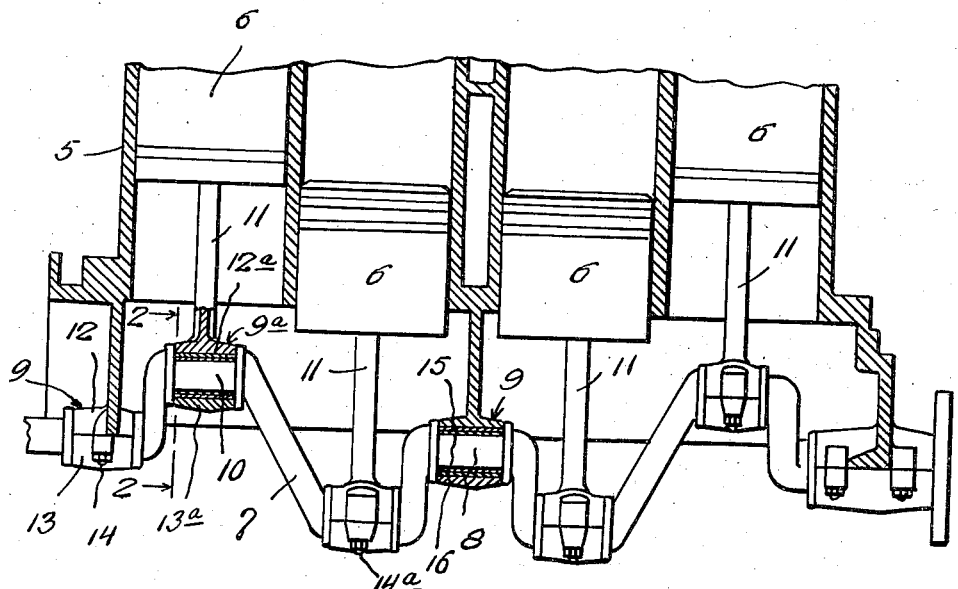
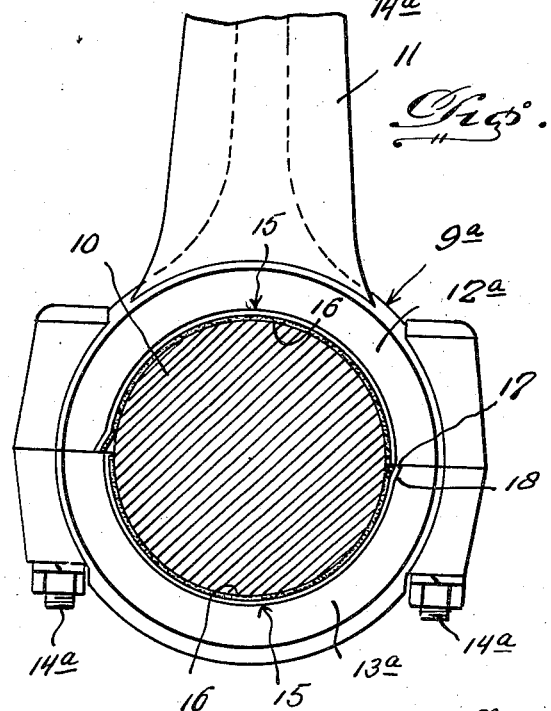
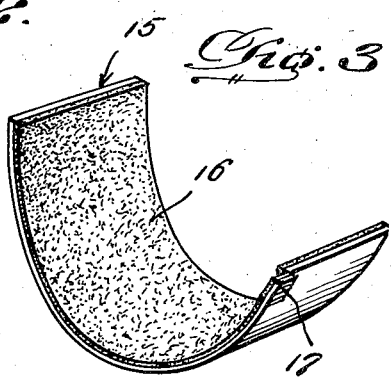
Inventor
Frank Postma,
By J. Stanley Burch
Attorney Patented Dec. 27, 1938

2,141,823

UNITED STATES PATENT OFFICE 2,141,823

ABRADING LINER

Frank Postma, Ridgewood, N. J.

Application September 17, 1937, Serial No. 164,389

2 Claims. (Cl. 51—204)

This invention relates to abrading elements, and has more particular reference to a new article of manufacture consisting of an abrading liner for the bearings of engine crankshafts, adapted to be substituted for the bearing liners of said bearings in carrying out the abrading method disclosed in my co-pending application for U. S. Letters Patent Serial Number 164,390, filed September 17, 1937.

The present application is directed to the abrading liner per se, used in carrying out the aforesaid abrading method, and the invention consists in the novel nature and construction of the device as hereinafter more fully described, shown in the accompanying drawing and claimed.

In the drawing:

Figure 1 is a fragmentary sectional view showing an engine whose crankshaft bearings are provided with abrading liners embodying the present invention.

Figure 2 is an enlarged fragmentary section taken on line 2—2 of Figure 1 at one side of a connecting rod bearing; and Figure 3 is an enlarged perspective view of one of the abrading liner sections employed in Figures 1 and 2.

Referring in detail to the drawing, 5 indicates an engine cylinder block having pistons 6 reciprocable in the cylinders thereof. As usual, the engine crankshaft 7 has a plurality of spaced journals 8 mounted in bearings 9 of the engine block 5, and the cranks of said crankshaft have journals 10 engaged in bearings 9a provided on the lower ends of connecting rods 11, to the upper ends of which the pistons 6 are attached. As is well known in the art, each of the bearings 9 and 9a includes a half bearing or bearing block integral with the cylinder block 5 and the connecting rod 11 as respectively indicated at 12 and 12a, and a separate half bearing or bearing cap 13 and 13a detachably bolted as at 14 and 14a to the bearing block 12 and 12a, respectively. As is also well known in the art, the bearings 9 and 9a are usually provided with thin bearing liners which are seated loosely in the bearings and clamped therein by the bolts 14 or 14a by which the several sections of the bearings are clamped together. Each of these bearing liners usually consists of a pair of semi-cylindrical members composed of a thin outer shell adapted to seat against the bore of the bearing and having bonded to its inner surface suitable anti-friction material which engages the crankshaft journal. The bearing liner sections are usually the same width or length as the bearing and are seated in contacting relation with each other at their end or longitudinal edges.

In accordance with the present invention, abrading liners, conforming in general size and shape to the usual bearing liners, are provided for substitution for said bearing liners, such abrading liners each consisting of a pair of semi-cylindrical members 15 composed of a thin outer shell adapted to seat against the bore of the bearing and having secured or bonded to its inner surface granular abrading material 16 such as emery or carborundum, which bears upon the crankshaft journal. These abrading liner sections are the same width or length as the bearing and are seated in contacting relation with each other at their end or longitudinal edges. Suitable means such as is usually provided in connection with the bearing liners, is provided to assure retention of the abrading liner sections in the correct positions with respect to each other and the bearing. In the construction illustrated by way of example, this means consists of a lug 17 struck outwardly from an end of each abrading liner section and adapted to engage in a recess 18 of the associated bearing member and to abut the adjacent end of the coacting bearing member as shown clearly in Figure 2. In this way the abrading liner sections are also held against turning with the crankshaft journal, the thin outer shell of the abrading liner section being constructed of relatively stiff and strong material such as suitable sheet metal, which will effectively resist destruction and distortion upon rotation of the crankshaft.

In use, the abrading liners are placed in the bearings and clamped or bolted therein by the bolts 14 and 14a, whereupon crankshaft 7 is rotated by any suitable or preferred means so as to subject the journals of the crankshaft to the abrading action of the abrading liners. As the abrading operation proceeds, the abrading liners may be adjusted by means of suitable shim plates interposed between the bearing and the abrading liners, or thicker abrading liners may be substituted for those initially placed in the bearings, if found necessary. In the initial steps of the use, and after the crankshaft journals have been abraded sufficiently to true the latter, the journals may be finally polished by substituting further similar abrading liners of a finer character or wherein the abrading material is of a finer texture. Of course, it is necessary to rotate the crankshaft for a sufficient length of time after the abrading liners are placed in the bearings. Upon completing the polishing operation, the abrading liners are removed and the bearings are ready for reception of new bearing liners. These operations are performed without removing the crankshaft from the engine and without the necessity of a separate and distinct lapping and polishing machine of expensive construction. By truing and polishing the crankshaft journals in the engine block and connecting rod bearings, accurate and efficient truing of the bearings is insured in a most expeditious and economical manner. The abrading liners may be individually manufactured in proper sizes and grades, or they may be formed at the point of operation by cutting suitable blanks from sheet abrading material especially manufactured for the purpose.

From the foregoing description, it is believed that the nature of the present invention, as well as its advantages, will be readily understood and appreciated by those skilled in the art. In making use of the present invention, adoption of many common expedients will suggest themselves to those skilled in the art, such as the use of shim plates between the bearing and abrading liner sections for adjusting the bearings as the abrading operation progresses, the use of different means to insure proper position of the abrading liner sections in the bearing, etc.

What I claim as new is:

1. As a new article of manufacture, an abrading liner for engine crankshaft bearings consisting of a pair of semi-cylindrical members composed of a thin sheet metal outer shell adapted to seat against the bore of the bearing and having bonded to its inner surface granular abrading material adapted to bear upon the crankshaft journal, said abrading liner sections being of the same width and adapted to be seated in contacting relation with each other at their end edges, and means carried by said abrading liner sections adapted to cooperate with the engine bearings to retain the abrading liner sections in correct positions with respect to each other and the bearing.

2. As a new article of manufacture, an abrading liner for engine crankshaft bearings consisting of a pair of semi-cylindrical members composed of a thin outer shell of relatively stiff and strong sheet material adapted to seat against the bore of the bearing and having bonded to its inner surface granular abrading material adapted to bear upon the crankshaft journal, said abrading liner sections being of the same width and adapted to be seated in contacting relation with each other at their end edges, and means carried by said abrading liner sections adapted to cooperate with the engine bearings to retain the abrading liner sections in correct positions with respect to each other and the bearing.

FRANK POSTMA.